May 13, 1958     C. J. DAVIES     2,834,045
APPARATUS FOR PRODUCING FOAM RUBBER SLAB MATERIAL
Filed March 5, 1956     5 Sheets-Sheet 1
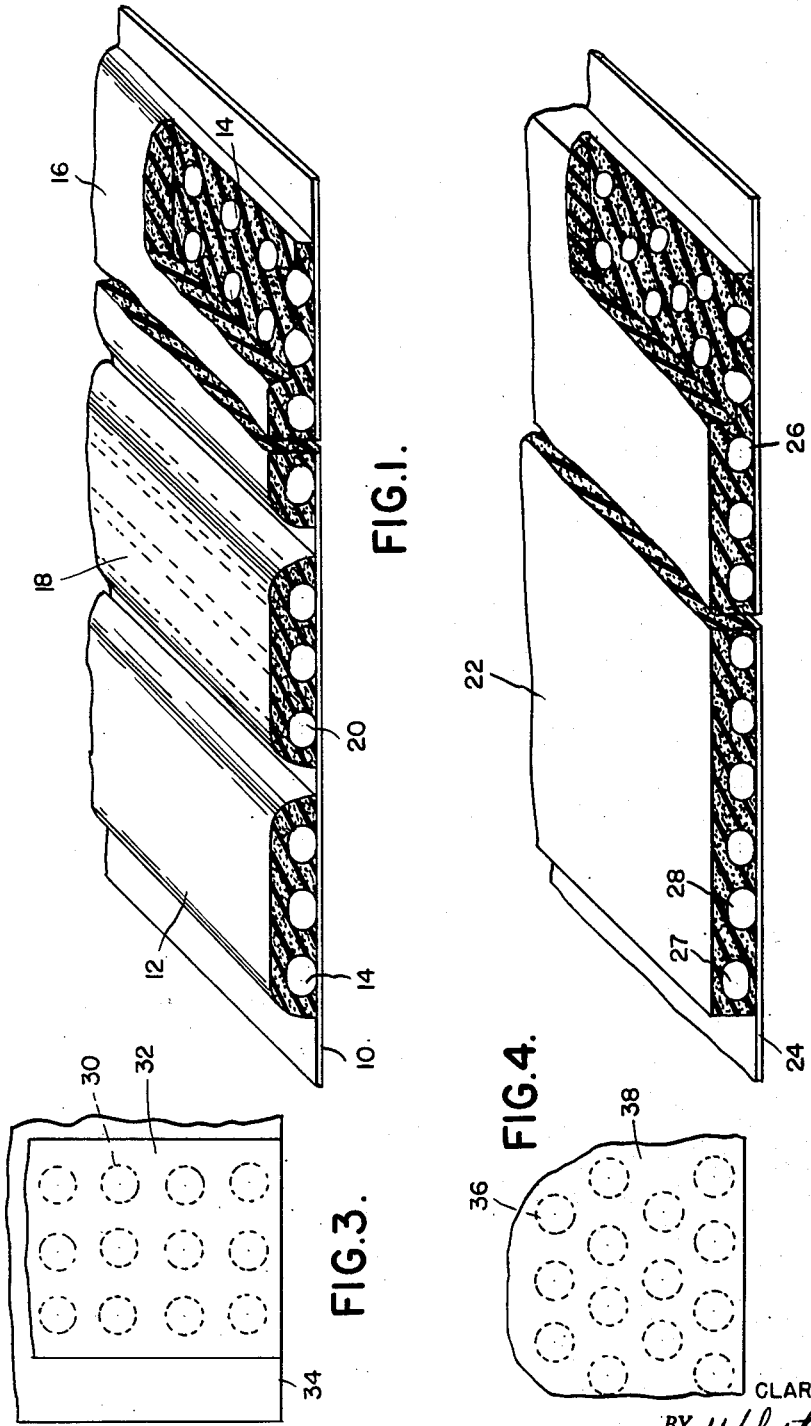
INVENTOR.
CLARENCE J. DAVIES
BY Whittemore,
Hulbert & Belknap
ATTORNEYS

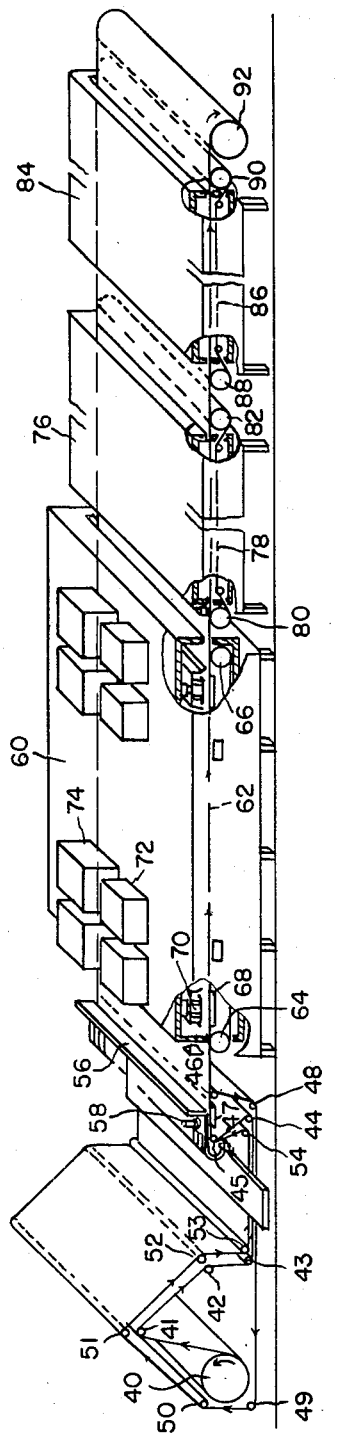

May 13, 1958 C. J. DAVIES 2,834,045
APPARATUS FOR PRODUCING FOAM RUBBER SLAB MATERIAL
Filed March 5, 1956 5 Sheets-Sheet 3
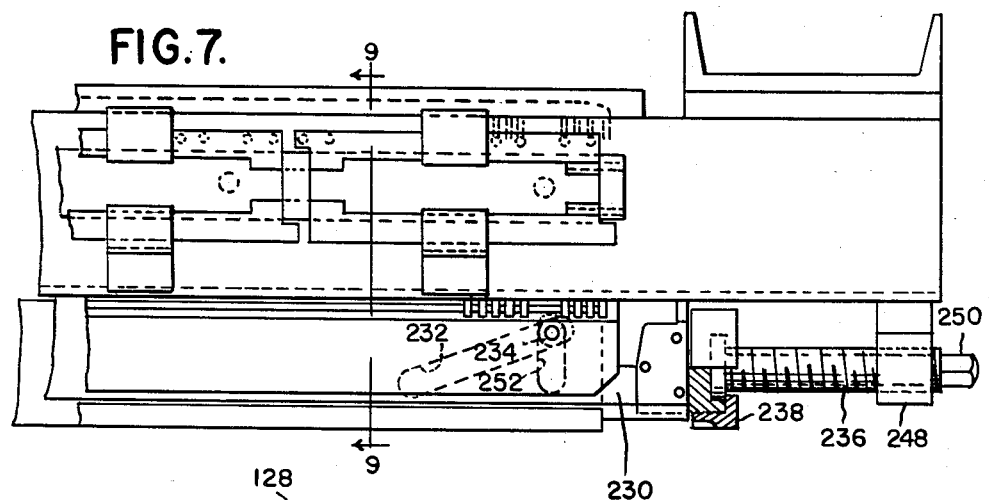
FIG. 7.
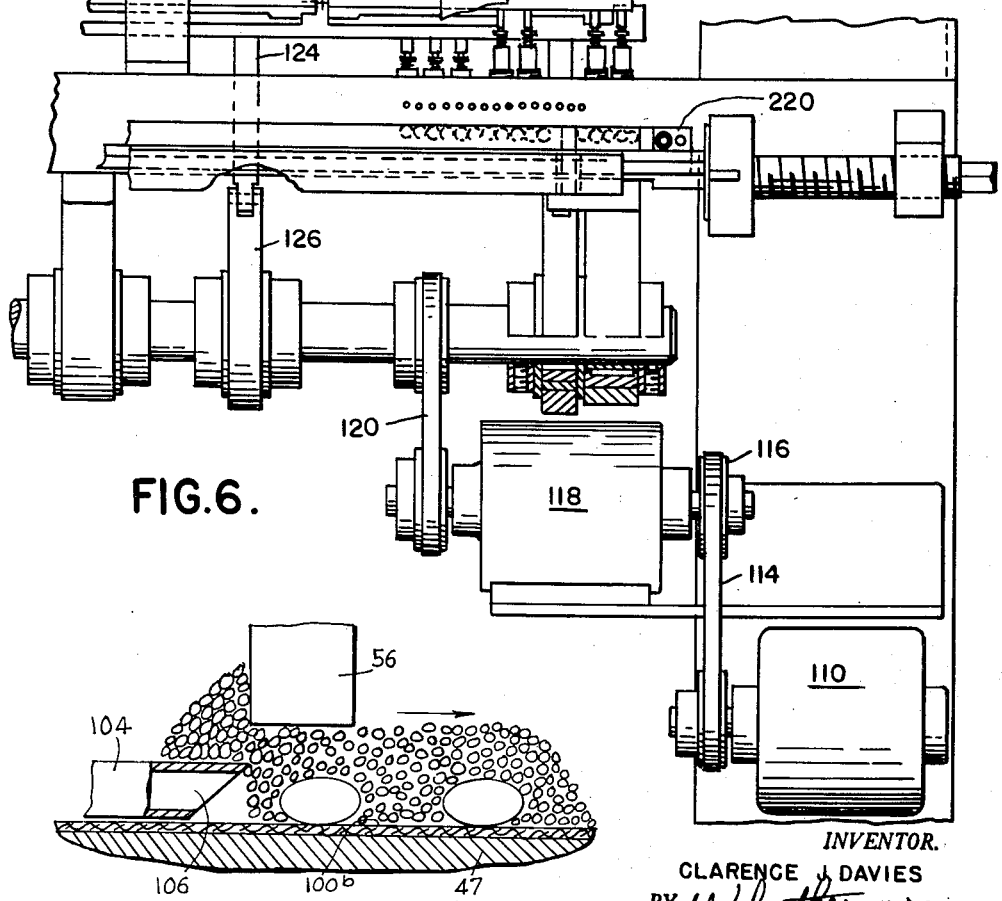
FIG. 6.
FIG. 8A.
INVENTOR.
CLARENCE J. DAVIES
BY Whittemore,
Hulbert & Belknap
ATTORNEYS

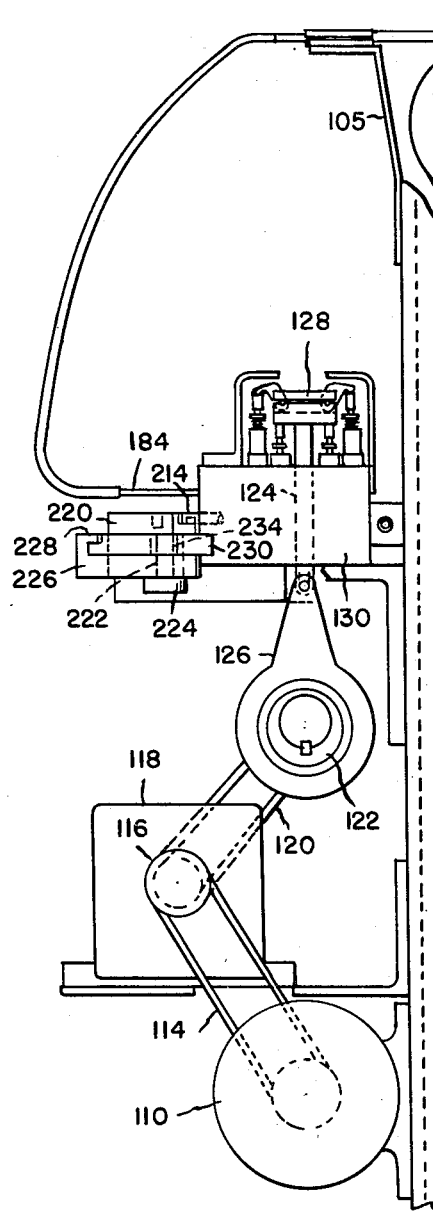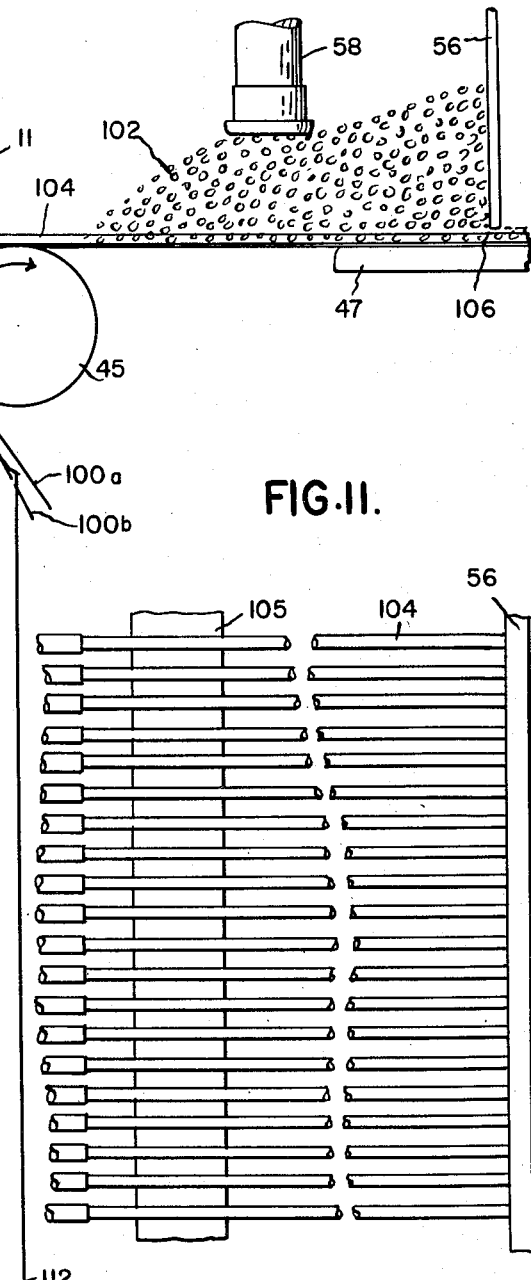

May 13, 1958 C. J. DAVIES 2,834,045
APPARATUS FOR PRODUCING FOAM RUBBER SLAB MATERIAL
Filed March 5, 1956 5 Sheets-Sheet 5

INVENTOR.
CLARENCE J. DAVIES
BY
ATTORNEYS

United States Patent Office 2,834,045
Patented May 13, 1958

2,834,045

APPARATUS FOR PRODUCING FOAM RUBBER SLAB MATERIAL

Clarence J. Davies, Grosse Pointe Woods, Mich., assignor to National Automotive Fibres, Inc., Detroit, Mich., a corporation of Delaware Application March 5, 1956, Serial No. 569,304

7 Claims. (Cl. 18—4)

The present invention relates to foam rubber slab material and the apparatus for producing the same.

In many applications of foam rubber slab or contoured pipes a greater degree of softness or compressibility is permissible than is possible to attain with the lightest foam rubber now being made with uniform foam structure throughout its thickness. In order to produce foam rubber with a greater degree of softness and at the same time to reduce the amount of rubber required to attain a required thickness, it has been the practice to form rubber in molds having cores to produce cavities or recesses. This method of course is not applicable to the production of a continuous strip.

In theory, it would be possible to produce cavities in a continuous process by doctoring the foam onto a belt having cores attached to the surface. This procedure is not practical as in a continuous process, the rubber cannot be stripped from the belt until curing has been completed; thus the belt would have to be several hundred feet in length and the entire belt would have to be changed each time a change is required in the core size, spacing or depth. Even this method would not be available to produce foam rubber provided with a fabric backing, without pre-cutting openings in the backing to allow the cores to enter.

Lightening of the product by introduction of cavities into the foam rubber is particularly desirable because it permits the use of a less expensive latex or alternatively, requires less consistency in the latex since it permits control of density substantially as desired.

The practice of the present invention makes it possible to reduce the actual weight and volume of rubber used by 25 to 30%, while at the same time attaining a softness equal to that of lower density foam rubber compounded with little or no filler. Accordingly, a product equivalent in all respects to the finest and most expensive latex compound may be produced in a continuous process while effecting substantial savings represented by (1) the use of less expensive latex, (2) the possibility of employing substantial amounts of relatively inexpensive filler material, and (3) the reduction in the volume and weight of material used.

It is a further object of the present invention to provide a novel apparatus for producing the product which comprises means for and the step of injecting into latex foam a plurality of accurately located and accurately measured charges of a gas.

It is a further object of the present invention to provide apparatus for advancing latex foam beneath a doctor blade and injecting measured charges or bubbles of gas into the foam just prior to or during its passage beneath the doctor blade.

It is a further object of the present invention to provide apparatus as described in the preceding paragraph in which the charges of gas are introduced into the latex foam in a plane intermediate the upper support surface and the lower surface of the doctor blade, and preferably as close to the lower surface thereof as possible.

It is a further object of the present invention to provide apparatus for producing the product in which a supporting material such as a fabric is applied to one surface, and preferably the lower surface, of the foam latex prior to its passage beneath the doctor blade.

It is a further object of the present invention to provide apparatus for producing completely enclosed cavities continuously in foam rubber slab including variation of cavity size, spacing and/or pattern.

It is a further object of the present invention to provide apparatus of producing foam rubber slabs having a backing sheet which comprises introducing charges of gas into the foam latex after the foam latex has been applied to the backing sheet, and thereafter doctoring the latex to the required slab thickness.

It is a further object of the present invention to provide apparatus for producing the product which includes a plurality of elongated air tubes having exhaust ports at their extreme ends, said tubes being located such that they extend parallel to the path of advance of a support belt and said exhaust ports being located in a zone directly in advance of or in the space below a doctor blade.

It is a further object of the present invention to provide apparatus as described in the preceding paragraph comprising valve means for releasing charges of gas under pressure through said exhaust ports in a predetermined recurring pattern.

It is a further object of the present invention to provide apparatus as described in the preceding paragraph which comprises means for effecting release of gas charges simultaneously from alternate tubes so as to produce a staggered pattern of cavities.

Other objects and features of the invention will become apparent as the description proceeds, especially when taken in conjunction with the accompanying drawings, wherein:

Figure 1 is a perspective sectional view with parts broken away of a product produced in accordance with the present invention.

Figure 2 is a perspective sectional view with parts broken away of a second embodiment of the present invention.

Figure 3 is a fragmentary plan view showing one arrangement of cavities within the slab material.

Figure 4 is a view similar to Figure 3 showing a different arrangement of cavities within the slab material.

Figure 5 is a perspective diagrammatic view with parts broken away showing the complete structure for producing the slab material.

Figure 6 is a fragmentary enlarged front elevational view of the apparatus for producing measured charges of pressurized gas.

Figure 7 is a plan view of the structure shown in Figure 6.

Figure 8 is a side elevational view of the structure shown in Figure 6 including the apparatus for supplying the gas bubbles to the foam.

Figure 8A is an enlarged fragmentary sectional view showing the relationship between the needle and the doctor blade.

Figure 11 is a plan view looking in the direction of the arrow 11 in Figure 8.

Figure 9:
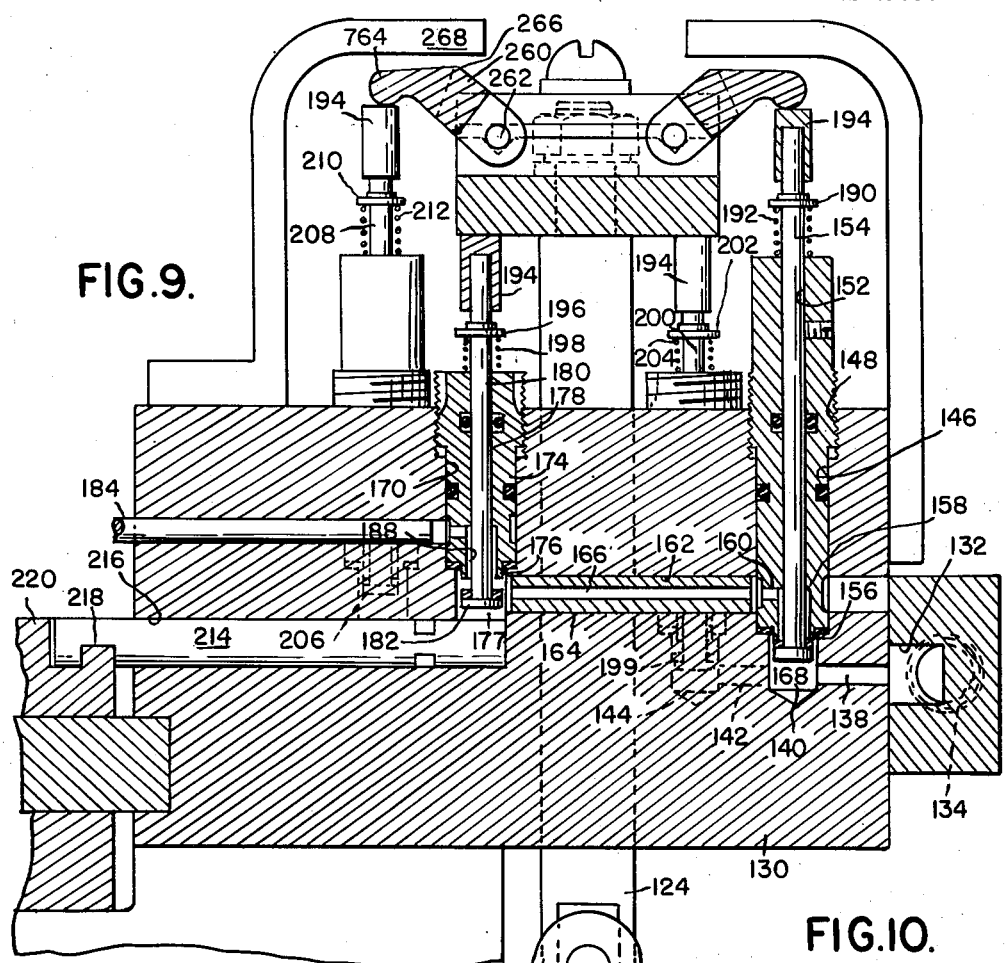
Figure 9 is an enlarged sectional view on the line 9—9, Figure 7.

Referring now to Figures 1–4 there is illustrated several embodiments of the present invention.

Referring first to Figure 1 there is shown a product comprising a backing material 10 which may be in the form of a woven fabric. Disposed on this material are the elongated pipes 12 formed of sponge rubber. In Figure 1 the backing material is shown as provided with three pipes but the exact number and shape of the upper surface of the pipes is immaterial so far as the present invention is concerned.

Distributed uniformly throughout the interior of the foam rubber forming the pipes are a plurality of completely enclosed cavities 14. These cavities as best illustrated at the lower right hand corner of the figure, are generally spherical in contour. This portion of the figure is broken away to show the cavities 14 located substantially below the upper surface 16 of the pipes and relatively close to the bottom surface of the foam rubber where it is bonded to the upper surface of the backing material.

As will subsequently appear, the completely enclosed cavities are produced by injecting predetermined small charges of air into the uncured foam just prior to or preferably during advancement of the foam beneath a doctor blade to shape its upper surface as desired. Inasmuch as relatively small charges of gas or air are injected, the enclosed cavities are substantially ellipsoid with the long axis parallel to the movement of the material. However, it is within the contemplation of the present invention to provide for prolonged emission of gas or air into the uncured foam as it is advanced with the formation of elongated, generally circular cross-section cavities which may be completely enclosed. However, the product may be produced in a continuous manner so that when it is severed transversely into acceptable sections, the elongated cavities formed as aforesaid, may extend completely through the severed section. The dotted lines 18 in Figure 1 are intended to indicate continuous cylindrical passages 20 which extend completely through the severed section of the continuous foam material.

Figure 2 is a view similar to Figure 1 except that in this case the foam is shown as shaped into a slab 22 bonded to the upper surface of a flexible backing sheet 24 which again, may be a woven fabric. In this case also the interior of the foam has formed therein a plurality of completely enclosed cavities 26.

It is to be particularly noted that the upper surface of the pipes 12 and the upper surface of the slab 22 are completely smooth and afford no visual indication of the presence of the enclosed cavities 14, 20 or 26 therebeneath. In order to insure that this condition prevails, the enclosed cavities are provided closely adjacent the lower surface of the foam rubber; that is, the surface which is bonded to the flexible backing sheet. In some cases the enclosed cavities may be spaced slightly above the lower surface of the foam so that a wall of appreciable thickness of foam rubber separates the lower portion of the cavities from the upper surface of the backing fabric. Such a cavity is indicated at 27 in Figure 2. In other cases the cavities may be formed in a manner which displaces the uncured foam laterally from a substantial area of the backing fabric. Such a cavity is indicated at 28 in Figure 2 and it will be observed that in this case the cavity in effect is a recess extending upwardly into the body of the foam from the lower surface thereof, the opening into the recess being covered by the backing material 24.

In all cases, as described above, the backing material is bonded to the foam without the use of adhesive. Thus, where the foam is a foam rubber produced from latex, the bond between the backing material and the foam body is produced by vulcanization. If the foam is of a plastic material other than rubber, again the bond is produced during curing of the foam. Thus, in all cases the backing material is bonded to the foam without the use of adhesive, and hence the under surface of the foam is pervious to air to a much greater extent than it would be if the fabric were bonded by adhesive to the under surface of the foam.

Referring now to Figure 3 there is illustrated a pattern of recesses 30 which in this case may be substantially spherical completely enclosed recesses provided in a pipe 32 bonded to a backing fabric indicated at 34.

In Figure 4 there is illustrated a somewhat different arrangement in which the enclosed cavities 36 are staggered within the interior of the foam body 38 so as to produce a greater number of cavities within a given area.

The product described in the foregoing may be produced by the method and apparatus illustrated generally in Figure 5. The product to be produced by this apparatus is basically a slab or a series of pipes of continuous length united by the process of manufacture to a backing material which is preferably a woven fabric.

The apparatus comprises a suitable support for a roll 40 of backing material which is preferably a somewhat porous woven fabric. This material is drawn over rollers 41 and 42 and beneath rollers 43 and 44 and thence over rollers 45 and 46 and thence over a gauge plate 47. The backing material then passes beneath rollers 48 and 49, around and over rollers 50, 51 and 52, beneath rollers 53 and 54, and then again over rollers 45 and 46 and over the upper surface of the gauge plate 47. On its second pass over the gauge plate 47 the backing material continues through the balance of the apparatus as will now be described. However, it will be noted that the ply of backing material on which the foam is deposited just before it passes over the gauge plate 47 is superimposed upon a second ply of the backing material.

Disposed above the gauge plate 47 is a doctor blade 56, the lower edge of which is contoured as required to produce the required shape of the foam and has a substantial transverse dimension. In some cases the lower surface of the doctor blade will be a flat horizontal surface and in conjunction with the gauge plate 47 will produce a flat slab. In other cases the lower surface of the doctor blade may be contoured, for example to the shape required to produce the pipes 12 indicated in Figure 1. The doctor blade will of course be vertically adjustable to produce the required thickness of the product.

Just in advance of the doctor blade is one or more latex delivery tubes 58 which connect to a foaming machine in which the latex compound is foamed to the required consistency.

Before referring to the apparatus which produces the cavities within the foam product, the balance of the apparatus will be briefly described. The backing material with the desired covering of foamed latex passes into a gelling oven 60 where it is supported on a conveyor belt 62 preferably formed of alkyd impregnated woven glass cloth. The belt conveyor is supported by rollers 64 and 66 and the conveyor belt passes over bed plates 68 disposed beneath electrodes 70 adapted to effect dielectric heating of the product. Oscillators for the dielectric heating circuit are indicated at 72 and rectifiers therefor are indicated at 74.

When the now gelled foam on the backing material leaves the gelling oven it passes into a curing oven 76 where it is supported on a conveyor belt 78 which is preferably formed of wire mesh and is supported by rollers 80 and 82. Within the curing oven the product is cured by the application of heat, either applied by steam or hot air.

After the product leaves the curing oven it enters a dryer 84 where it is supported on a conveyor belt 86 carried by rollers 88 and 90. The conveyor belt 86 is also preferably a wire mesh conveyor to permit effective exposure of both surfaces of the product to the drying atmosphere.

When the product leaves the dryer it is completed and it is separated from the conveyor belt 86 and may be wound up into a roll as indicated at 92.

The present invention is concerned primarily with the method and apparatus for producing completely enclosed cavities or cells within the cured product and this is accomplished by the controlled introduction or injection of small charges of a gas such as air into the interior of the uncured foam during its passage on the backing material beneath the doctor blade 56.

As seen in Figures 6-9, the portion of the backing material making its first pass over the gauge plate 47 is designated 100a and that portion of the backing material making its second pass over the gauge plate 47 and which receives the foamed latex 102 is designated 100b. The means for supplying the charges of gas to the interior of the latex during its passage beneath the doctor blade 56 comprises a plurality of air tubes or needles 104 carried by a support 105 and having air passages therethrough terminating in outlet ports 106 at the ends of the air tubes or needles. As best seen in Figure 8A, the ports 106 are located in the space between the gauge plate 47 and the lower edge of the doctor blade 56, and further, the port at this position faces downwardly and in the direction of movement of the backing material.

In order to control the admission or injection of spaced charges of gas, the apparatus comprises a motor 110 carried by a support leg 112 and connected by a belt 114 to a pulley 116 of a variable speed drive 118. The variable speed drive in turn is connected by a belt 120 to drive an eccentric 122 which in turn drives push rods 124 through eccentric drive links 126. The push rods 124 at their upper ends are fixed to a valve operating bar or head 128 which through mechanism subsequently to be described actuates valves for controlling the admission or injection of air through the air tubes 104.

The valve housing bar 130 is carried by the support leg 112 and has connected thereto an air manifold 132 having a tapped opening 134 for connection to a source of gas, ordinarily air, under controlled pressure. The interior of the manifold is open as indicated at 136 to communication with a plurality of passages 138 leading to chambers 140 and passages 142 leading to chambers 144.

Extending upwardly from the chambers 140 are enlarged inlet valve openings 146 tapped at their upper ends as indicated at 148 to receive a tubular member 150 having a cylindrical guide opening 152 extending therethrough and adapted to receive the valve stem 154. Adjacent its lower end the member 150 is shaped to provide an inlet valve seat 156 and is laterally enlarged above the seat to form a passage 158 communicating with the transverse passage 160 which extends to a cylindrical opening 162 formed in the valve housing bar 130. Located in the cylindrical opening 162 is a tubular member 164 having a passage 166 extending therethrough. The valve stem 152 at its lower end has an inlet valve element 168 connected thereto which is opened by downward movement of the valve stem 152. Associated with each of the enlarged inlet valve openings 146 is an enlarged outlet valve opening 170 having a metering chamber 172 at its lower end and which receives a tubular member 174 the lower end of which is formed to provide an outlet valve seat 176. The member 174 is provided with a cylindrical guide opening 178 which receives a valve stem 180 to the lower end of which is connected the outlet valve element 182. Downward movement of the outlet valve element 182 opens the outlet valve and permits air or gas under pressure to escape from the chamber 172 through a tube 184 which communicates through a passage 186 with the annular space 188 surrounding the lower end of the valve stem 180.

The valve stem 154 has a radial flange 190 thereon and a compression spring 192 is provided engaging the underside of the flange 190 and the upper end of the stationary tubular member 150. The spring 192 urges the inlet valve element 168 upwardly toward closed position. The upper end of the stem 154 carries a cap 194.

The valve stem 180 adjacent its upper end has a radially extending flange 196 beneath which is engaged a compression spring 198 urging the outlet valve element 182 upwardly in closing relation to the outlet valve seat 176.

A second set of inlet valves 199 and associated structure which includes the chambers 144 are provided and each of these includes a valve stem 200 including a radially extending flange 202 adjacent its upper end engaging a compression spring 204 also urging the second set of inlet valves upwardly toward opening relation. In like manner, a second set of outlet valves and associated structure are provided, the valve element of one of these being indicated at 206 and connected to valve stem 208 having a radially extending flange 210 engaging compression spring 212 which urges the second set of outlet valves 206 upwardly in valve closing relationship. It will be apparent that a passage of a charge of gas from each of the inlet valves 140 is controlled by appropriate movement of the related inlet valves 168 and 182. In like manner, passage of charges of gas from the inlet chambers 144 is controlled by the appropriate actuation of inlet valves 199 and outlet valves 206.

In order to meter the quantity of gas or compressed air admitted to the uncured foam, means are provided for varying the capacity of the metering chambers 172. This means comprises cylindrical rods 214 longitudinally movable in cylindrical openings 216 formed in the valve housing bar 130 and communicating respectively with the separate metering chambers 172. It will be observed that movement of the rod 214 to the left as seen in Figure 9 for example, will open a space at the inner end of the rod, thus effectively increasing the capacity of the metering chamber 172.

In order to effect equal and simultaneous adjustment of all of the metering chambers 172, the rods 214 at their outer ends are connected, as by the notches 218, to an adjusting bar 220.

Referring again to Figures 6-8, the bar 220 has fixedly secured thereto depending pins 222 headed at their lower ends as indicated at 224. Fixedly secured to the valve housing bar 130 is a stationary bar 226 having an inwardly extending flange 228. Supported on the bar 226 and guided for longitudinal movement thereon is a bar 230. The bar 230 is provided with a plurality of elongated inclined slots 232 and secured on the pins 222 are rollers 234 received in the slots 232. Endwise movement is imparted to the adjusting bar 230 by means of an adjusting screw 236 connected at one end to the bar 230, as indicated at 238, and having an elongated threaded portion received within a fixed nut element 248. The outer end of the screw 236 is square as indicated at 250 and by rotation with a suitable hand tool of the screw 236, endwise movement of the adjusting bar 230 is accomplished. In order to support the adjusting bar 220 for limited motion only in a direction parallel to the rods 184, pins 222 extend through guide slots 252 provided in the fixed bar 226. With this arrangement longitudinal movement of the bar 230 results in transverse movement of the adjusting bar 220 and corresponding movement of the rods 214 to effect simultaneous equal adjustment of all of the metering chambers 172.

The means for actuating the various inlet and outlet valves 168, 182, 199 and 206 comprises the vertically reciprocable valve operating bar or head 128 which as previously described is actuated through the push rods 124.

As best illustrated in Figure 9, it will be observed that the upper ends of the push rods 200 and 180, or caps 194 applied thereto, are directly engageable by the under surface of the head 128 and are maintained in engagement therewith while the head 128 is in the lower position of its stroke by the compression springs 204 and 198.

In order to effect properly timed actuation of the valves 168 and 206, levers 260 are pivoted to the head 128 as indicated at 262. These levers include valve actuating toes 264 and include shoulders 266 engageable with the under surface of fixed abutments 268 carried by the valve housing bar 130. The arrangement is such that as the head 128 approaches the upper end of its stroke, the toes 264 are cammed downwardly against the caps 194 carried by the upper ends of the valve stems 154 and 208.

With the parts in the relationship illustrated in Figure 9, it will be observed that the head 128 is at or adjacent the lower end of its stroke. At this time the head 128 has opened all inlet valves 199 and has correspondingly opened all outlet valves 182. The inlet valves 199 are connected to outlet valves 206, while inlet valves 168 are connected to outlet valves 182. Accordingly, air under pressure in the manifold 132 is prevented from entering the metering chambers associated with the outlet valves 182 by reason of closure of the inlet valves 168. However, since the outlet valves 182 are open at this time, the charge of compressed air previously admitted to the metering chambers 172 is now permitted to pass through the tubes 184 to the tubes 104 for admission or injection into the interior of the foam material. At the same time, since the inlet valves 199 are open, air under controlled pressure flows past the inlet valves 199 to the metering chambers associated with the outlet valves 206 which at this time are closed, thus allowing the chamber to meter a predetermined charge of air for admission into the foam material. It will be appreciated that preferably, the inlet tubes connected to outlet valves 206 are arranged in alternate relation with respect to air inlet tubes connected to outlet valves 182.

Figure 10:
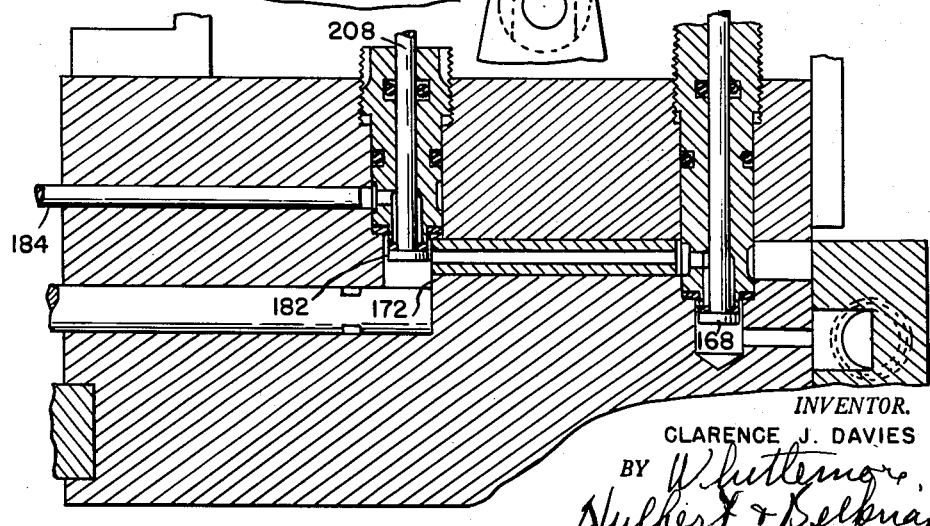
Figure 10 is an enlarged sectional view showing the lower portion of the structure shown in Figure 9, with the valves in closed position.

Referring now to Figure 10, an inlet valve 168 and an outlet valve 182 are illustrated in another position attained during the cycle. At this time both the inlet valve 168 and the outlet valve 182 are closed, thus trapping a metered quantity of compressed air within the chamber 172 so that when the outlet valve 182 is next opened a definite charge of air will be injected into the material through the air inlet tube associated with the outlet valve 182.

From the foregoing it will be observed that the cycle of operation is as follows: With the valves in the position illustrated in Figure 10, all of the valves are closed and the valve actuating head 128 is accordingly in intermediate position. If it is assumed that at this time the head is moving upwardly, the next valve actuation is accomplished by the levers 260 associated with the valve stems 208, pushing the valve stems downwardly to open the valves 206 and thus admit a charge of air through the air tubes associated with the outlet valves 206. It will be appreciated that at this time the inlet valves 199 leading to the outlet valves 266 are and remain closed. This upward stroke of the head also results in actuation of the lever associated with the valve stem 154 and accordingly, opens the inlet valves 168. The outlet valves 184 associated with the inlet valves 168 are and remain closed at this time and accordingly, a charge of compressed air passes the inlet valves 168 and flows into and fills the metering chambers 172 beneath the outlet valves 182.

Having completed its upward stroke, the valve actuating head 128 now starts to move downwardly. Initial downward movement of the head permits the levers 266 to be moved to the position illustrated in Figure 9 by the action of the springs 192 and 212 and this results in closing of the inlet valves 168 and closing of the outlet valves 266. Thus, during the middle of the down stroke of the head, all four of the valves are closed. As the head enters into the lower portion of its down stroke, it engages the caps 194 on the valve stems 200 and 180, thus opening inlet valves 199 to permit a flow of compressed air to the metering chambers below the now closed outlet valves 206, and also opens the outlet valves 182. Since the inlet valves 168 associated with the outlet valves 182 are closed, compressed air from the manifold 132 is cut off from the meter chambers 172 below outlet valves 182, and the previously metered charges of compressed air are permitted to flow past outlet valves 182 for injection into the foam.

Thus, assuming that adjacent needles or air inlet tubes 104 are connected respectively to outlet valves 182 and 206, it will be observed that a charge of air is admitted through alternate tubes during the up stroke of the head 128, and charges are introduced into the foam material through the remaining needles or air tubes during the down stroke. This arrangement provides the staggered pattern of cavities illustrated in Figure 4.

For a commercially acceptable product it is usually essential for the surfaces of the foam product to be smooth or to retain a predetermined shape. Accordingly, it would be unacceptable for the presence of the cavities to cause bulges in the adjacent portions of the surface of the product. This is avoided in the present product by the method and apparatus which involves the placement of the charge of compressed air under moderate pressure into the moving foam while the foam is not restrained. Accordingly, the compressed air is allowed to form a cavity in which it is confined under the pressure existing throughout the interior of the foam. Furthermore, the desired result is further insured by the provision of a doctor blade having a flat lower surface as indicated in Figure 8. If the doctor blade is designed to produce a shaped upper surface of the foam differing from a flat planar surface the doctor blade is shaped transversely to the required configuration but is given a substantial dimension parallel to the direction of movement of the foam to insure smoothness of the upper surface of the product.

The apparatus disclosed herein is designed to perform an operation in which individual charges of compressed air or gas are injected into the foam with the result that the completely enclosed cavities are substantially spherical in form. However, it will be appreciated that by properly controlling and metering the admission of air or gas and particularly, the pressure under which it is admitted, an operation may be performed in which the gas is admitted continuously after a small portion of the foam has passed beneath the doctor blade to form an elongated cylindrical opening. In this case it is essential to introduce the gas under careful control to initially form the cylindrical cavity and at the same time to maintain the gas pressure therein at the value required to maintain the cavity without either collapse or expansion thereof which might produce a surface indication of the presence of the cavity.

In describing the product it was pointed out that the cavities are preferably provided adjacent the under surface of the product and that in fact they may be tangent or include a substantial surface areas of the backing material. On the other hand, they may be spaced substantially midway between the upper and lower surfaces of the sponge material. It is also desired to emphasize the fact that the presence of the backing material is not essential to the present invention since the foam may be deposited upon a temporary backing material, the cavities formed wtihin the foam, and the backing material stripped from the cured foam after the curing operation.

In an example of the product, a slab of foam having a thickness of approximately 5/8 of an inch was formed upon a fabric backing material. Staggered substantially spherical completely enclosed cavities were formed therein having a diameter of approximately 3/8 of an inch. These cavities were formed closely adjacent the upper surface of the backing material leaving approximately 1/4 of an inch of foam between the upper portions of the cavities and the upper surface of the product. By this construction a product having substantially less material than a solid foam and having a greatly increased softness as compared to a solid foam product produced from the same latex was obtained.

Considerable variation may of course be used in the size of the enclosed cavities. However, the cavities are at least several times larger than the average bubble size of the foam. The product is not to be confused with a foam characterized by a very coarse bubble formation. Instead, a fine bubble formation of the foam is employed having the relatively large enclosed cavities therein, the cavities leaving yieldable struts or support portions therebetween which accounts for the substantial increase in softness of the product. In practice, it appears that the transverse dimension of the cavities should be related to the thickness of the product and utilization of the benefits would not appear to be fully attainable unless the cavities had a transverse dimension of not less than about 25% of the thickness. Very excellent results have been obtained when the dimension of the cavities is at least half the thickness of the product.

The drawings and the foregoing specification constitute a description of the improved foam rubber slab material and the apparatus and method for producing the same in such full, clear, concise and exact terms as to enable any person skilled in the art to practice the invention, the scope of which is indicated by the appended claims.

What I claim as my invention is:

1. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles being disposed with their ports located in the space between the conveyor and the lower edge of said doctor blade, means for admitting gas into the interior of the foam through said needles, and means for controlling the admission of gas.

2. Apparatus for injecting gas bubbles in uncured foam comprising a conveyor, a doctor blade over said conveyor to determine the shape and thickness of foam passing therethrough, means for depositing uncured foam on the conveyor just in front of said blade, a plurality of hollow needles having ports at the ends thereof, said needles being disposed with their ports located in the space between the conveyor and the lower edge of said doctor blade, and means for supplying separate charges of gas into the interior of said foam through each of said needles.

3. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles being disposed with their ports located in the space between the conveyor and the lower edge of said doctor blade, means for supplying separate charges of gas into the interior of said foam through each of said needles, and means for varying the size of said charges.

4. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles being disposed with their ports located just in front of the space between the conveyor and the lower edge of said doctor blade, means for supplying separate charges of gas into the interior of said foam through each of said needles, and means for varying the spacing of said charges longitudinally of the foam carried by said conveyor beneath said blade.

5. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles being disposed with their ports located just in front of the space between the conveyor and the lower edge of said doctor blade, means for supplying separate charges of gas into the interior of said foam through each of said needles, alternate ones of said needles constituting a first set and the remaining needles constituting a second set, and means for alternating delivery of charges between said first and second set.

6. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles having gas outlet ports facing slightly downwardly and toward the space between said conveyor and the lower edge of said blade, and means for admitting gas into the interior of the foam through said needles.

7. Apparatus for injecting gas bubbles in uncured foam comprising a conveyor, a doctor blade over said conveyor to determine the shape and thickness of foam passing therebeneath, means for depositing uncured foam on the conveyor just in front of said blade, a plurality of hollow needles having ports at the ends thereof, said needles being disposed parallel to said conveyor with their ports located just in front of the space between the conveyor and the lower edge of said doctor blade, and means for admitting gas into the interior of the foam through said needles.

References Cited in the file of this patent

UNITED STATES PATENTS

| | | |
|---|---|---|
| 1,670,911 | Stone et al. | May 22, 1928 |
| 1,952,311 | Cornell | Mar. 27, 1934 |
| 2,103,003 | Fischer | Dec. 21, 1937 |
| 2,194,364 | Minor | Apr. 16, 1940 |
| 2,713,699 | Pooley | July 26, 1955 |
| 2,763,897 | Gates et al. | Sept. 25, 1956 |

FOREIGN PATENTS

| | | |
|---|---|---|
| 466,629 | Great Britain | June 1, 1937 |